United States Patent [19]

Einstein et al.

[11] 4,131,782
[45] Dec. 26, 1978

[54] METHOD OF AND APPARATUS FOR MACHINING LARGE NUMBERS OF HOLES OF PRECISELY CONTROLLED SIZE BY COHERENT RADIATION

[75] Inventors: Bernard C. Einstein, Bern; Peter Spring, Thun, both of Switzerland

[73] Assignee: Lasag AG, Thun, Switzerland

[21] Appl. No.: 682,409

[22] Filed: May 3, 1976

[51] Int. Cl.² ............................................. H01S 3/09
[52] U.S. Cl. ......................... 219/121 LM; 346/76 L; 331/94.5 M; 219/121 EM; 358/128
[58] Field of Search ..... 219/121 L, 121 LM, 121 EB, 219/121 EM; 331/94.5; 346/76 L, 112; 178/6.6 DD, 6.6 R

[56] References Cited
U.S. PATENT DOCUMENTS

| | | | |
|---|---|---|---|
| 3,636,251 | 1/1972 | Daly | 346/76 L X |
| 3,751,587 | 8/1973 | Insler et al. | 346/76 L X |
| 3,755,646 | 8/1973 | Muller | 219/121 LM |
| 3,781,902 | 12/1973 | Shim | 346/76 L X |
| 3,808,394 | 4/1974 | Mominee | 219/121 LM |
| 3,832,718 | 8/1974 | Berkowitz et al. | 346/76 L X |
| 3,932,726 | 1/1976 | Verheyan et al. | 219/121 LM |
| 4,001,840 | 1/1977 | Becker | 219/121 L X |

FOREIGN PATENT DOCUMENTS 1958430  9/1971  Fed. Rep. of Germany ....... 219/121 L

*Primary Examiner*—J. V. Truhe
*Assistant Examiner*—M. Paschall
*Attorney, Agent, or Firm*—Wegner, Stellman, McCord, Wiles & Wood

[57] ABSTRACT

A method of and apparatus for machining an object wherein a source of coherent radiation is pulse modulated in accordance with the desired machining and the radiation is directed to a deflecting device and deflected to the object which is moving at a controlled speed. Movement of the deflecting device is controlled to deflect the pulsed radiation on the area of the object to be machined regardless of its motion. The method is applied to engrave intaglio printing forms by using gating or pulse length modulation to reproduce accurately the large number of volume variations of the printing cells.

17 Claims, 12 Drawing Figures

METHOD OF AND APPARATUS FOR MACHINING LARGE NUMBERS OF HOLES OF PRECISELY CONTROLLED SIZE BY COHERENT RADIATION

BACKGROUND OF THE INVENTION

The machining of objects by means of coherent radiation, especially laser radiation, is a well known technique. However, many industrial applications require levels of quality and reproducibility which cannot be met with known laser beam techniques. In general, the machining shows disturbing phenomena, e.g., thermal destruction of surrounding material, deposition around the machined area of material ejected in liquid state, and poorly defined boundaries of the machined area. The machining of a large number ($\simeq 10^8$) of holes of precisely controlled size, e.g., equal within volume variations of less than 1%, or of controlled different sizes, e.g., 100 discrete volume steps, has not heretofore been accomplished with laser radiation.

Systematic investigations of the events during laser heating and vaporization of transparent media and highly reflective metals have led recently to a new machining technique by which the disturbing phenomena could be avoided. This machining technique disclosed in copending U.S. patent application Ser. No. 728,403 is based on laser systems characterized by fundamental mode operation which affords constant energy output, with controlled emission time. This emission can be adapted to the kind of machining and to the material machined to achieve optimum quality. To machine a number of small discrete areas distributed on an object one can either (1) move the object continuously and chop the radiation (short pulses), or (2) move the object in a stop-and-go manner and use longer pulses, or (3) move the object and direct the radiation to machine successive areas spaced on the object along the direction of movement. In the first case (1), the duration of one radiation pulse must be adapted to the speed of movement and to the dimension of the machined area. The second case (2), in which the object is moved in a stop-and-go manner, needs stepping motors capable of accelerating and decelerating the object. This clearly limits the applicability of this method to small, light objects. Directing the beam (3) over the entire number of areas can only be accomplished at the requisite high beam powers with present techniques if the space occupied by the areas is confined within narrow limits, the practical extent of which depends on the necessary access time.

SUMMARY OF THE INVENTION

The principal object of the present invention is to provide a fast and accurate method of machining a pattern of uniformly spaced, discrete areas of precisely controlled size of narrow tolerances, distributed on an object, by means of coherent radiation.

In accordance with the present invention, the required size control of the areas to be machined is achieved by modulating a source of coherent radiation to produce uniformly controlled radiation pulses. This pulsed radiation is directed on a deflecting device which may be continuously moved along the object being machined. The object itself is continuously moved (translated or rotated) in another direction. By means of the deflecting device the pulsed radiation is directed on one discrete area on the object for the time period of at least one pulse, or of a train of pulses. The motion of the area of radiation impact relative to the discrete area of the moving object to be machined is kept zero as long as the machining lasts. Then the deflecting device directs the next radiation pulse or pulse train to the next discrete area to be machined. The deflection of the radiation is controlled so that the area of radiation impact follows the area to be machined despite the movements of the object and of the deflecting device. The control of the volume removed from each area to be machined is accomplished by making the number of laser pulses or the duration of a laser pulse applied to said area proportional to the volume. The pulse number control, sometimes referred to herein as gating of pulses, allows the machining of holes in discrete volume steps up to the number of pulses required for the largest holes. By using fundamental mode laser radiation modulated at a constant frequency, generated by resonators as described in U.S. Pat. Nos. 3,805,015 and 3,821,661, a regular pulse train at a pulse energy stability of 1% is achievable, resulting in a volume resolution of 1%. This method permits much higher rates of machining than by any previously available techniques.

Some examples of articles which may be fabricated by the present method are: perforated filter sheets, information storage means acting as read-only memories, video discs, and intaglio printing cylinders. Such cylinders most commonly have a copper outer sheath which is hard to machine by laser radiation, especially by $CO_2$-laser radiation, because of the high reflectivity of copper to light at the wave length of $CO_2$ laser radiation. It is known that an intensity of the laser pulses of $10^8$ W/cm$^2$ is needed to machine copper with a $CO_2$ laser.

THE DRAWINGS

Figure 8A:
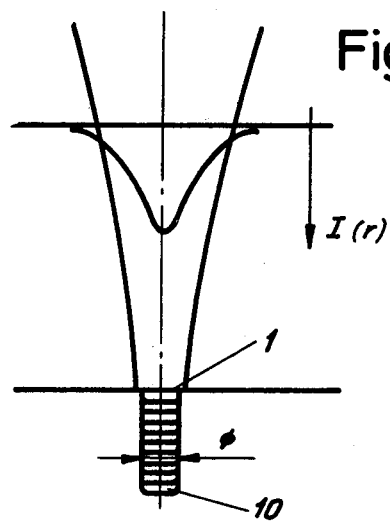
Figure 8B:
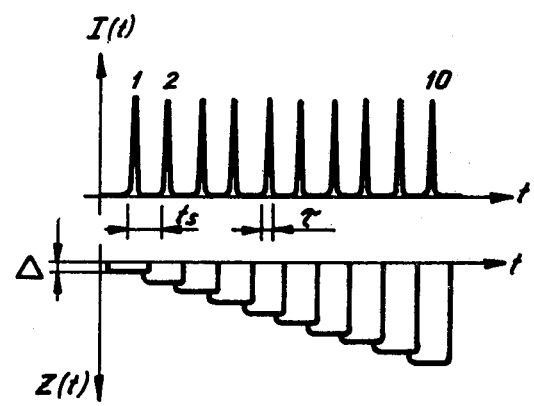
Figure 8C:
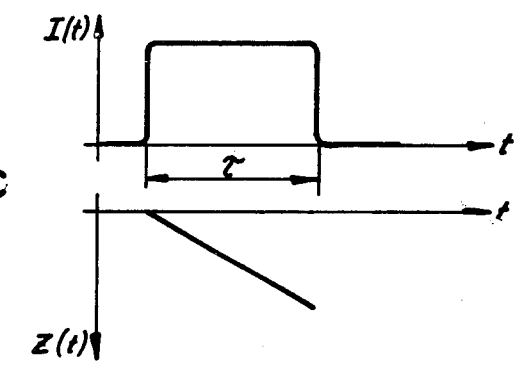
Figure 9:
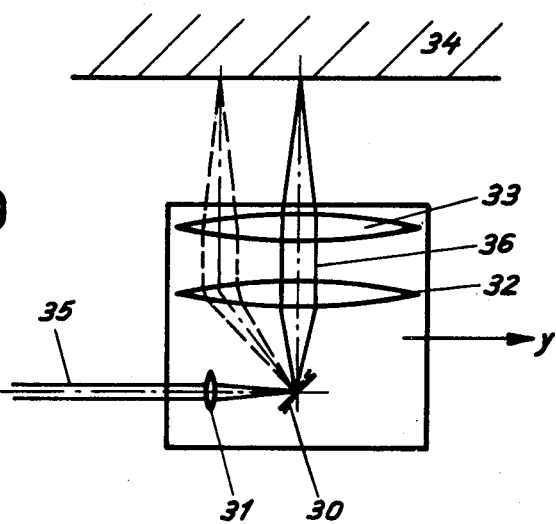
Figure 10:
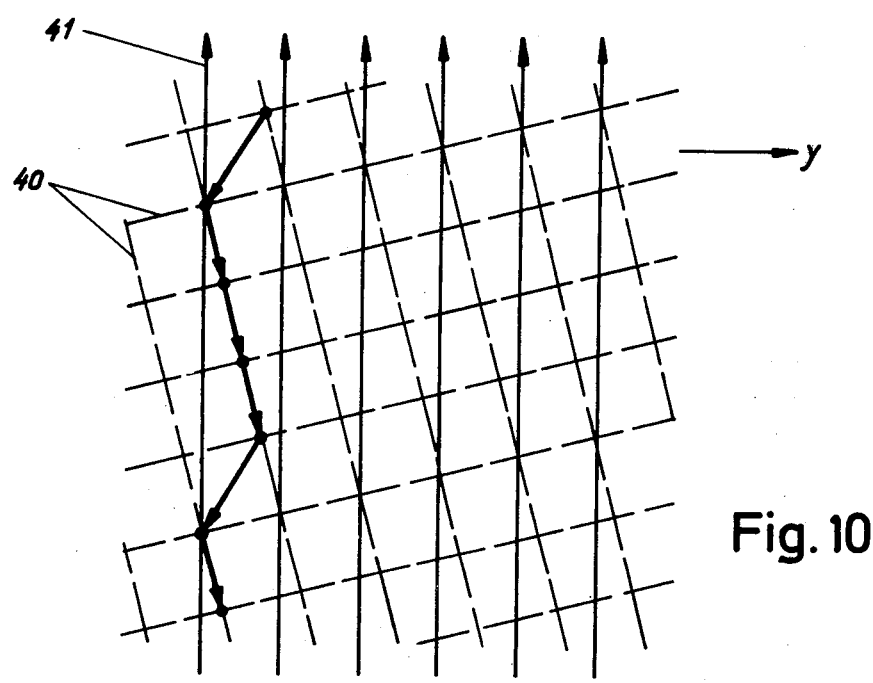

FIGS. 8a, b are diagrammatic illustrations of the machining of holes in discrete steps;

FIG. 8c is a diagrammatic illustration of the machining of a hole with pulse length modulation;

FIG. 9 is a schematic drawing of the optical system to focus the coherent radiation on the object to be machined; and FIG. 10 is an illustration of a sawtooth path for the deflected beam.

DETAILED DESCRIPTION OF THE INVENTION

Figure 1:
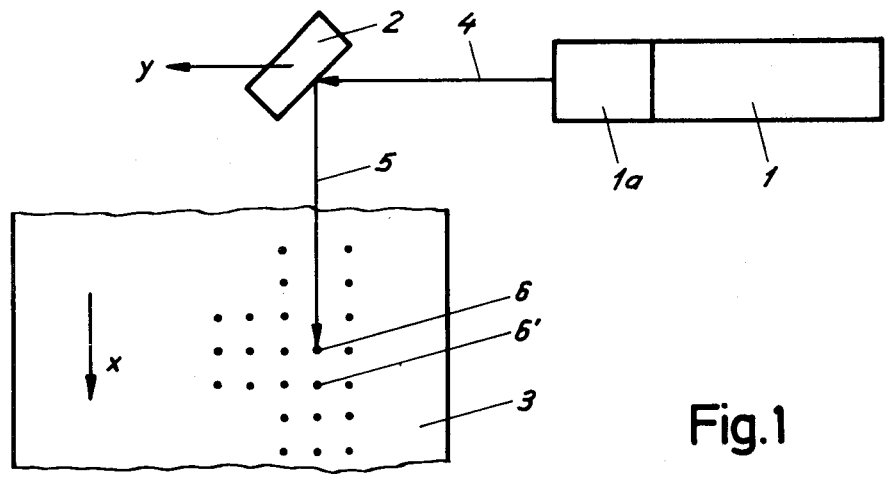
FIG. 1 is a schematic view of an apparatus for performing the present method.

FIG. 1 shows a portion 3 of an object with a pattern of discrete, small areas 6, 6' which are to be machined. A coherent radiation source 1 includes modulating means 1a and emits a modulated radiation 4 directed to a deflecting device 2 from which deflected radiation 5 is directed to one of the discrete areas 6. The deflecting device is moved in direction y, preferably at right angles to direction x, at constant speed or following a predetermined speed program. The object moves in the direction indicated by the arrow x, preferably at a constant speed.

The deflecting device can be a galvanometric laser beam deflector available from General Scanning Inc., Watertown, Ma., or a piezoelectrically tiltable mirror, described in the U.S. Pat. App. Ser. No. 552,998. Rotating optical wedges or prisms, well known in optics, may be used as deflecting devices in an apparatus where the speeds in x and y direction are constant. The deflecting device may include focusing means, and a beam expander may be mounted on the radiation source 1 or combined with the deflecting device 2, neither being shown in FIG. 1. The use of focusing optics and a beam expander minimizes variations in the size of the radiation beam (spot size) which impinges on the object as the relative positions of the deflecting device and the object change.

Figure 2:
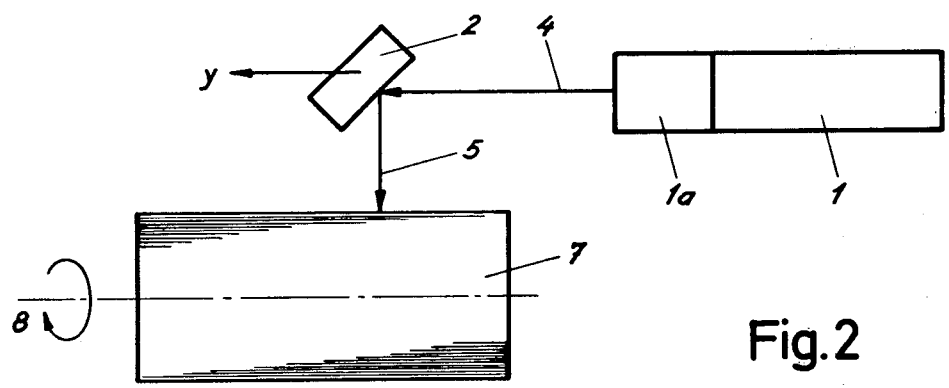
FIG. 2 is a schematic view of an apparatus for machining cylindrical objects by the present method.

FIG. 2 shows a cylindrical object the surface 7 of which is to be machined. Here, the movement of the object is a rotation 8 around the axis of the cylinder. An example of such an embodiment is a machining apparatus for intaglio printing cylinders in which the material to be machined is copper. In this case, the discrete areas are the intaglio cells.

Figure 3:
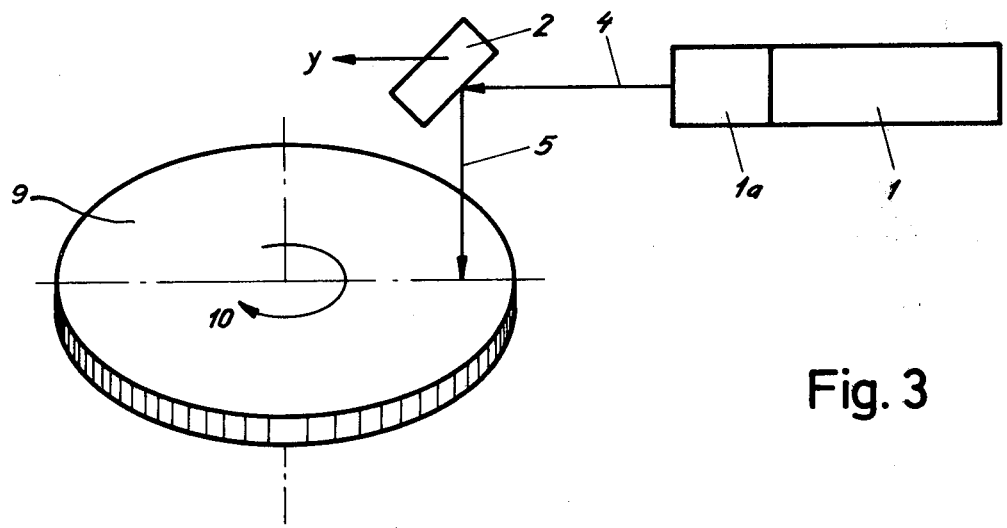
FIG. 3 is a schematic view of an apparatus for machining discoidal objects by the present method.

FIG. 3 illustrates an object 9 having disc shape. The movement of this disc is a rotation 10. The direction y is approximately radial.

The maximum period of time needed to machine one discrete area by means of one or a plurality of radiation pulses is defined as $\tau$. Moving the object in a stop-and-go manner to position successive areas under the deflected radiation 5 requires a time which can be several orders of magnitude greater than $\tau$. Moving the object continuously without tracking by the radiation results in blurred machined areas, unless the movement of the object during the period $\tau$ is a small fraction of the diameter of the discrete area 6. A much higher overall speed of machining can be reached with the present method in which radiation 5 is deflected to precisely the discrete area to be machined, even though the object being machined is constantly moved. This is explained with reference to FIG. 4.

Figure 4:
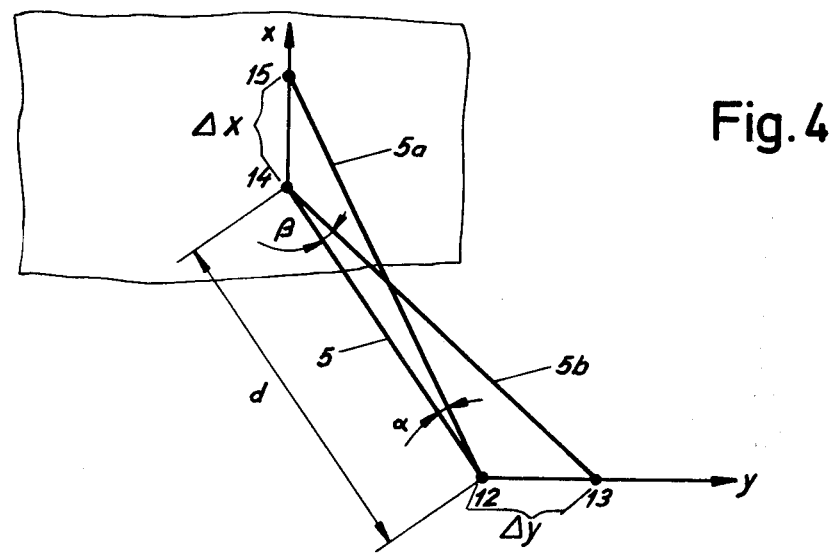
FIG. 4 is a schematic view which explains the function of the deflecting device.

At an instant t, which is the beginning of a machining operation, the deflecting device is located at point 12 and a discrete area to be machined is at point 14. A period $\tau$ later, i.e., at the time $t + \tau$, the discrete area will be moved by $\Delta x$ to 15, due to the movement of the object in the x direction, which occurs at a speed $\Delta x/\tau$. At the instant t the radiation coincides with 5 and at $t + \tau$ with 5a. If d is the distance between the object and the deflecting device, the deflection of the radiation has to be changed, during the period $\tau$, in x direction, by the angle $\alpha = \Delta x/d$. In FIG. 4 the scale is distorted for clarity. Distance d is many orders of magnitude greater than the increment of movement $\Delta x$ so that the angle $\alpha$ is accurately approximated by the tangent, $\Delta x/d$.

If the deflecting device is moved in y direction during the period $\tau$ with a speed $\Delta y/\tau$, it will be located at point 13 when this period $\tau$ has elapsed, i.e., at the time $t + \tau$. Therefore, the deflection angle in y direction must change by the angle $\beta = \Delta y/d$.

If focusing optics are moved with the deflecting device, the varying distance between coherent radiation source and optics may cause variation of the spot size on the object. The focal spot size variation is minimized by utilizing a beam expander between the coherent radiation source and the focusing optics to enlarge the radiation diameter. The beam expander can be mounted on the coherent radiation source or it can be combined with the moving radiation deflecting device as seen in FIG. 9. The deflecting device 30 is preferably located at the smallest beam diameter in the beam expander 31/32. The radiation 35 is enlarged 36 before being focused by the optics 33 on the object surface 34. Where optics focus the coherent radiation on the object, the distance d is replaced by the distance between the deflecting device 30 and lens 32. The angles $\alpha$ and $\beta$ require corresponding correction. Similarly, when all the discrete areas to be machined are equally distributed in an x-y pattern, the deflection angles $\alpha$ and $\beta$ will vary in a sawtooth manner where the slopes depend on the speeds in x and y direction and on the distances separating two successive areas.

The machining of one discrete area with plural pulses, or with a constant power pulse of duration $\tau$, are shown schematically in FIG. 8. In FIGS. 8a, 8b, the incident laser beam consists of 10 pulses 1–10. The radial intensity distribution I(r) of the beam is Gaussian. The diameter $\phi$ of the area to be machined is determined by the diameter of the radial intensity distribution and of the material properties. The deflecting device may include a focusing system of conventional lenses to match the diameter of the radiation beam and the cell dimension. The first pulse of an energy E vaporizes a volume element of material 1 of thickness $\Delta$ where the relation $$\Delta = 4E/\phi^2 \pi L_v$$

holds, where $L_v$ is the energy to vaporize one mm³ of the material. For copper $L_v = 54$ watt-seconds/mm³. Each of the subsequent pulses vaporizes one more volume element of the material. The intensity of the pulses must on one hand be high enough to reach an absorption state, i.e., sufficient to overcome the strong reflection of metals or the high transparency of dielectrics; but on the other hand, it must not be so high as to produce disturbing effects such as shock waves in the material or gas breakdown in the vapor cloud. The duration of each pulse $\tau$ is chosen to be smaller than the time constant of heat conduction $t_{WL}$ of the material $$\tau < t_{WL} \simeq 0.05 \, \phi^2/\kappa$$

where $\kappa$ is the thermal diffusivity; for copper $\kappa = 1.05$ cm²/s.

The absorption state (heated material layer) produced by the first pulse exists for a time $t_a$ which depends mainly on the material properties. The next pulse has to impinge on the new surface, below the volume increment vaporized by the pulse preceding, within the time $t_a$, to be absorbed; the pulse separation $t_s$ should, however, be larger than the time $t_D$ needed by the vaporized material to escape the hole. Therefore, the relation $t_D < t_s < t_a$ holds, where $t_D$ is typically 0.3 μs and $t_a \simeq 10\ t_{WL}$.

The time development of the pulse intensity I(t) and the corresponding depth of the hole Z(t) are illustrated for a pulse train, FIG. 8b, and for a constant power pulse, FIG. 8c. The correlation between spatial coordinate Z and the time t allows control of the depth of the hole by the number of pulses or by the pulse duration τ.

Figure 5:
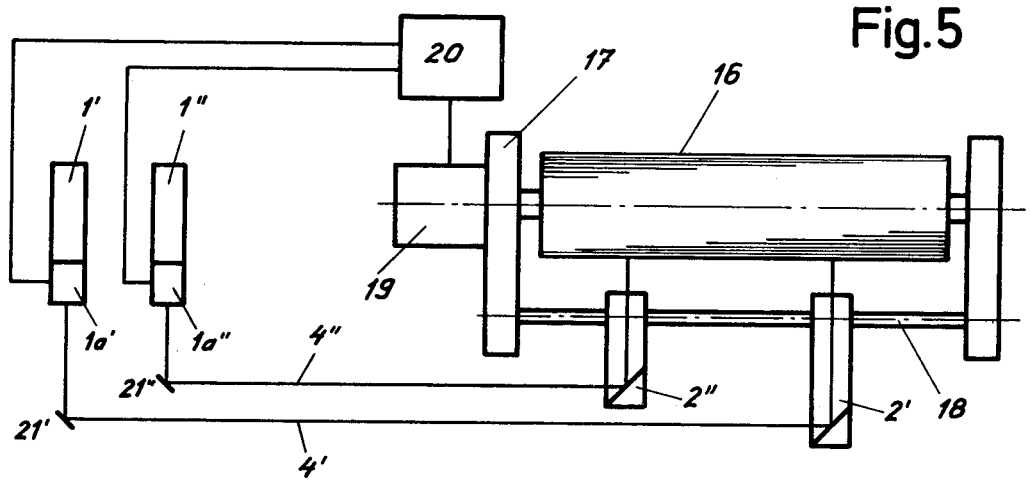
FIG. 5 is a schematic view of an apparatus for engraving an intaglio printing cylinder by the present method.

FIG. 5 shows schematically a more complete embodiment of an apparatus similar to that of FIG. 2, which is particularly useful for engraving intaglio printing cylinders. Two radiation sources 1' and 1" are shown as example, but one alone or more than two may be used if convenient. Each source also comprises modulating and pulse gating means 1a' and 1a".

The cylinder 16 is rotatably mounted on a support 17 which includes driving and guiding means 18, as a screw, for the deflecting devices 2' and 2". The cylinder is rotated by a motor 19, which drives in synchronism the deflecting devices 2' and 2" so that they move linearly along the cylinder. The emitted radiation beams are first deflected by fixed mirrors 21' and 21" so as to impinge on the deflecting devices 2' and 2" in a direction corresponding to the direction of their movement. The modulating and pulse gating means 1a' and 1a" of the sources 1', 1", the driving motor 19 and the positioning means (not shown) for deflecting devices 2', 2" are under control of a control unit 20, which establishes the location and depth of the areas to be machined.

Typically, an intaglio printing cylinder has 40 to 50 million separate square or circular cells per m², each of about 120 μm diameter and about 150 μm between centers. The depths of the cells may vary by increments of one μm to a maximum depth which is typically 50 μm so that the maximum cell volume is about $0.5 \times 10^{-8} mm^3$.

The control of cell volume can be achieved by pulsewise machining of each cell. The number of pulses is chosen to produce the desired cell volume. A total of 30 pulses for the deepest cell has proven to give good resolution of the printing density scale.

Using a laser as a radiation source allows pulse modulation of the emitted radiation. The pulses may each have an energy of one milliJoule (for example) and a duration of 0.5 μsec. The pulse repetition rate may be e.g. 124 kc. This gives a maximum period τ for the engraving of one cell equal to $30/124.\ 10^{-3}$ sec ≃ 240 μsec (see FIG. 7b). For a cell area to be within range of the deflecting device for 250 μsec, with typical cylinder, e.g., 27.5 cm diameter, and cell dimensions described above, the cylinder should rotate at 38 rpm, with a linear speed of the deflecting device of 0.1 mm/sec.

Figure 7:
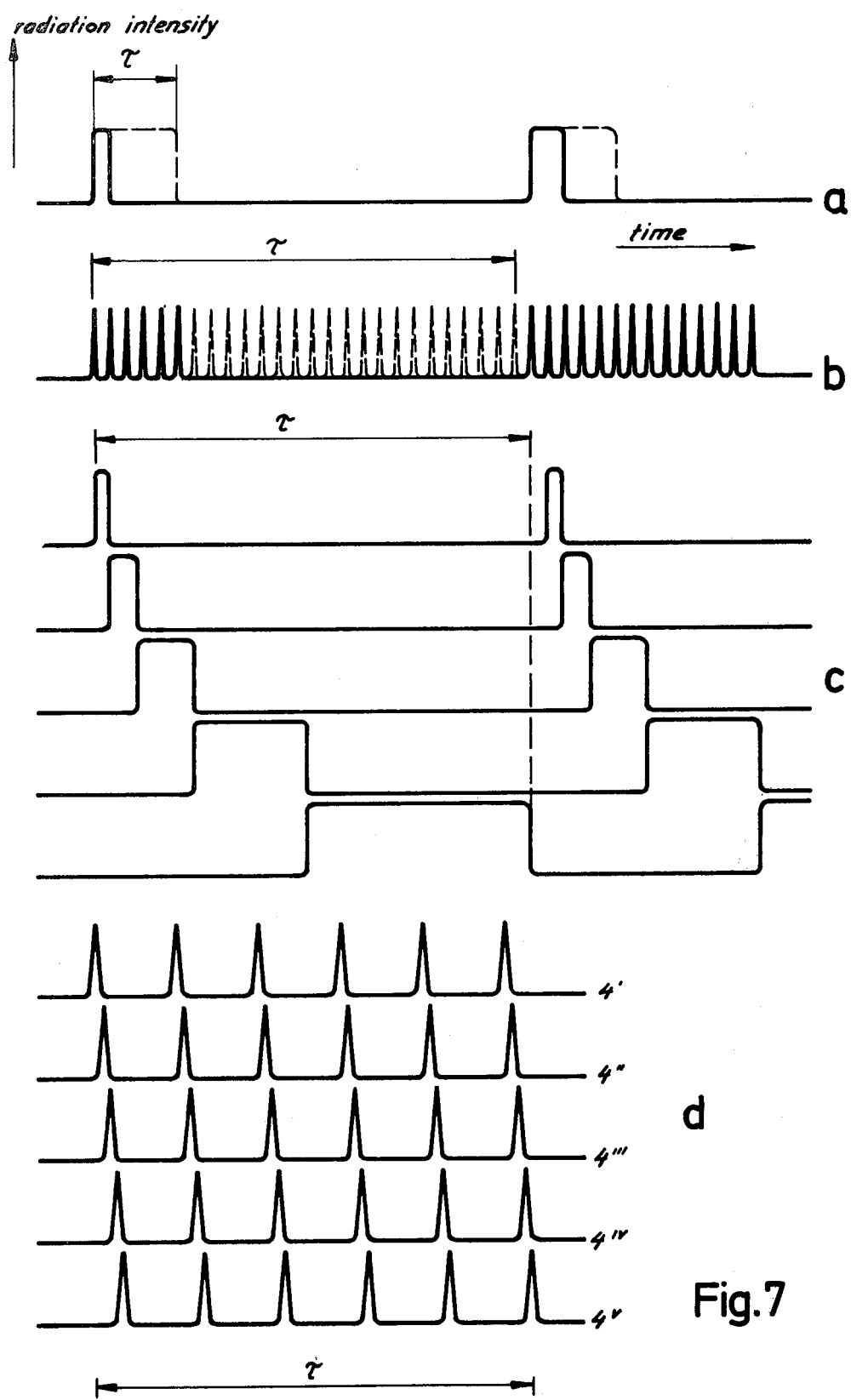
FIG. 7 is an intensity versus time representation of:
  (a) pulse length modulation
  (b) pulse number modulation
  (c) pulse selection modulation with a plurality of sources emitting different pulses; and
  (d) pulse selection modulation with a plurality of identical sources.

According to the desired cell depth the number of pulses emitted by the radiation source and deflected to one cell location is gated by the modulating means which also suppresses all the following pulses until the deflecting device is positioned to deflect the beam to the next cell location. FIG. 7b shows two successive pulse trains of different number of pulses.

In this example it may not be necessary to follow the cell in the y direction during the period τ. With a speed of 0.1 mm/sec and a period τ of 240 sec the resulting blurring will extend over 0.024 μm which is within the acceptable limits for this purpose.

The y direction capability of the deflecting device may be very useful for producing a screen angle different from the one given by the screw motion. This is a technique used to avoid moire-effects and color shifts if several colors are printed. The same machining problem must be solved when areas on a pattern must be machined which lie on the crosspoints of a grid whose orientation is tilted by a certain angle to the x, y directions of movement.

The areas that will be machined successively are not aligned on a straight line but have to be tracked on a zigzag course. The control signal to the deflecting device for its deflection in the y direction will then be a sawtooth-like signal corresponding to the screen or tilt-angle, to the separation of the areas, and to the speed of motion of the object. FIG. 10 shows the sawtooth path of the deflected beam on the object surface for producing a screen 40 tilted with respect to the direction of motion 41.

A commercially available computer controlled machine for making intaglio printing cylinders is equipped with a diamond stylus which machines the cylinder surface with a punching action. A satisfactory apparatus for practicing the present method can be provided by substituting the deflecting devices and the radiation source for the diamond stylus.

One may use an electro-optical shutter which blocks the beam path when the pulse should not exist to modulate a laser emitting pulses at a constant frequency so as to produce pulses of variable length. The pulse duration may vary between zero and 30 sec, and the energy of one pulse between zero and 30 milliJoule (see FIG. 8c).

With the present method, the limiting factor for the machining speed is the power available from the radiation source. To overcome this limit and to further increase the speed, one may combine the radiations emitted by a plurality of discrete sources.

Figure 6:
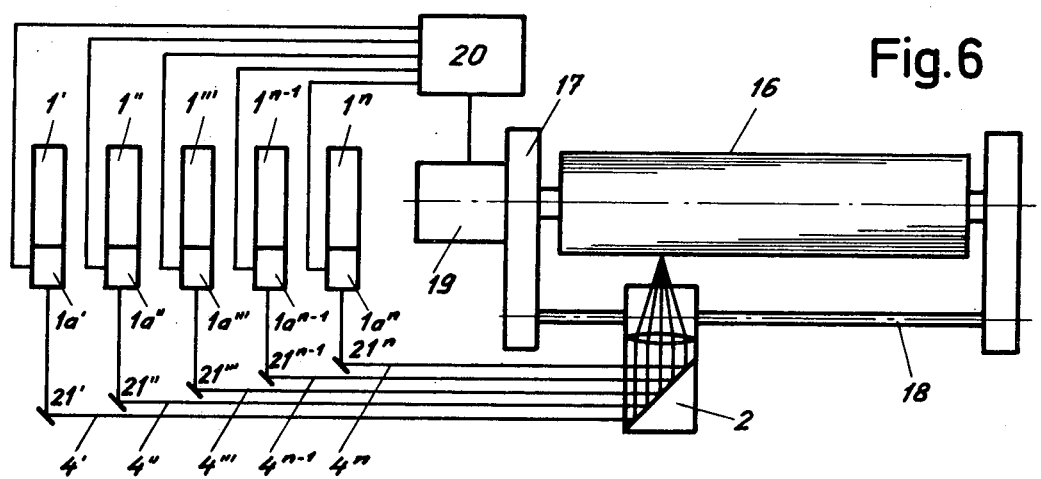
FIG. 6 is a schematic view of another apparatus for engraving an intaglio printing cylinder.

One such embodiment is schematically shown in FIG. 6, where similar elements are marked by the same reference numerals as in the foregoing figures. A plurality of n sources 1' to $1^n$ are provided, each emitting radiation 4' to $4^n$ directed on deflecting device 2. The direction of the radiation and the deflecting and focusing properties of the deflecting device are such that a single focused spot of a size corresponding with the cell to be machined is directed on the surface of cylinder 16.

The n radiations are time multiplexed (FIG. 7d). Two different kinds of modulation may be used.

In a first kind the sources are modulated to produce single pulses each of constant duration and energy at constant repetition rate (FIG. 7d). The addition of all the radiations by the deflecting device results in a series of pulses impinging on the object 16 at an average frequency of n times the frequency of pulses emitted by one source. Therefore, the rotating speed of the object 16 may be n times higher than what can be reached by using only one source of equal power. The modulating means 1a' to $1a^n$ are controlled by the control unit 20 to emit single pulses according to the machining program of control unit 20. As an example, for engraving cells arranged on a pattern of 160 μm center to center spacing, a period τ of 50 μsec may be used, leading to a speed of the object of 3.2 m/sec and, based on a typical gravure cylinder size a rotating speed of the order of 200 rpm. To reach a resolution in cell depth or volume one may chose n = 5 and a single source repetition rate of 6 pulses per 50 μsec = τ.

In a second kind the sources are modulated to produce single pulses at constant repetition rate but with a constant duration and energy specific to each source (FIG. 7c). The source k will produce pulses of a duration $2^k$ times longer than those produced by the first source. By selecting the souces to emit and by suppressing temporarily the pulses from the other sources, one can, by combination, obtain a total energy for machining one area (cell) by $2^n$ steps. Emission of the different sources is again distributed over the period $\tau$. The first source produces its pulse at the beginning of this period $\tau$ and the pulse from the source k is delayed by at least $2k-1$ times the duration of the first pulse. As an example, the first pulse may have a duration of 1 $\mu$sec and an energy of 1 mJ. The second pulse then has a duration of 2 $\mu$sec, the third pulse of 4 $\mu$sec and so on. Using 5 sources enables, by addition of all pulses, to machine one area (cell) with an energy of $2^5$ times 1 mJ, that is 32 mJ.

The given figures of energy and duration of pulses are based on a laser machining method as described in pending Swiss patent application No. 12766/75, which shows laser radiation sources producing single $TEM_{00}$ mode radiation and optimal radiation intensity for machining metals with very high efficiencies.

We claim:

1. A method of machining a plurality of cells on a continuously moving intaglio printing form thereby forming a pattern on said intaglio printing form wherein each cell machined defines a cell volume and the volume of the cells varies on said intaglio printing form, said method comprising:
   pulse modulating a coherent radiation source according to the pattern; and
   directing the modulated coherent radiation from said source successively onto said intaglio printing form for machining the plurality of cells while maintaining a zero velocity between the continuously moving intaglio printing form and the coherent radiation during machining of each of the plurality of cells.

2. The method of claim 1 wherein said pulse modulating comprises modulating the coherent radiation source to form successive identical pulses, and gating the number of pulses directed on each discrete area according to the pattern.

3. The method of claim 1 wherein said pulse modulating comprises modulating the coherent radiation source to produce successive pulses of pulse-lengths according to the pattern.

4. The method of claim 1 wherein said directing of said coherent radiation follows a sawtooth function according to the pattern and the speed of said moving object to assure the maintenance of the zero velocity.

5. The method of claim 1 including the step of focusing said coherent radiation.

6. The method of claim 1, wherein the period of said on-off modulation frequency is smaller than $0.5 \cdot \phi^2/\kappa$ of the to-be-machined material, and larger than the escaping time of the vaporized material.

7. The method of claim 1 wherein said radiation pulses are focused on the surface to be machined to have an intensity of about $10^8$ W/cm$^2$.

8. The method of machining a plurality of cells on a continuously moving intaglio printing form thereby forming a pattern on said intaglio printing form wherein each cell machined defines a cell volume, and the volume of the cells varies on said intaglio printing form, said method comprising:
   pulse modulating a coherent radiation source according to the pattern;
   directing the modulated coherent radiation from said source onto a deflecting device; and
   controlling said deflecting device so that the coherent radiation impinges successively on said intaglio printing form for machining the plurality of cells while maintaining a zero velocity between the continuously moving intaglio printing form and the coherent radiation during machining of each of the plurality of cells.

9. The method of claim 8 wherein said source comprises a plurality of single sources.

10. The method of claim 9 wherein said deflecting device comprises a plurality of single deflecting devices, one for each source.

11. The method of claim 9 wherein said plurality of sources are pulse modulated each to produce successive pulses.

12. The method of claim 9 wherein said pulse modulating includes modulating each single source to produce successive identical pulses and gating the number of pulses directed on said deflecting device according to the pattern.

13. The method of claim 9 wherein said pulse modulating comprises modulating each single source to form successive pulses.

14. The method of claim 13 wherein said pulse modulating comprises suppressing selected pulses in accordance with the pattern.

15. The method of claim 8 wherein said controlling comprises deflecting said coherent radiation in a sawtooth manner according to the spacing of the cells and the speed of said moving intaglio printing form therefor.

16. The method of claim 8 wherein said radiation pulses are focused on the surface to be machined to have an intensity of about $10^8$ W/cm$^2$.

17. The method of claim 8, wherein the period of said on-off modulation frequency is smaller than $0.5 \cdot \phi^2/\kappa$ of the to-be-machined material, and larger than the escaping time of the vaporized material.

* * * * *